US012801954B2

(12) United States Patent
Sen et al.

(10) Patent No.: US 12,801,954 B2
(45) Date of Patent: Nov. 17, 2026

(54) BAYESIAN HIERARCHICAL MODELING FOR LOW SIGNAL DATASETS

(71) Applicant: Capital One Services, LLC, McLean, VA (US)

(72) Inventors: Mohar Sen, Ashburn, VA (US); Nithin Nethipudi, McLean, VA (US); Suresh Kumar Simhadri, Bangalore (IN)

(73) Assignee: Capital One Services, LLC, McLean, VA (US)

( * ) Notice: Subject to any disclaimer, the term of this patent is extended or adjusted under 35 U.S.C. 154(b) by 953 days.

(21) Appl. No.: 18/151,236

(22) Filed: Jan. 6, 2023

(65) Prior Publication Data

US 2024/0152789 A1 May 9, 2024

(30) Foreign Application Priority Data

Nov. 7, 2022 (IN) ............................ 202241063457

(51) Int. Cl.

*G06N 7/01* (2023.01)
*G06F 18/15* (2023.01)
*G06F 18/2415* (2023.01)
*G06F 18/2431* (2023.01)

(52) U.S. Cl.

CPC ............... *G06N 7/01* (2023.01); *G06F 18/15* (2023.01); *G06F 18/24155* (2023.01); *G06F 18/2431* (2023.01)

(58) Field of Classification Search

CPC .......... G06N 7/01; G06N 3/045; G06N 20/00; G06F 18/15; G06F 18/24155; G06F 18/2431; G06F 18/2415; G06F 18/2148

See application file for complete search history.

(56) References Cited

U.S. PATENT DOCUMENTS

| | | | | |
|---|---|---|---|---|
| 10,235,601 | B1 * | 3/2019 | Wrenninge | G06F 18/214 |
| 11,334,762 | B1 * | 5/2022 | Wrenninge | G06F 18/214 |
| 12,242,892 | B1 * | 3/2025 | Burnett | G06F 9/45533 |
| 2019/0080246 | A1 * | 3/2019 | Sun | G06Q 30/0201 |
| 2020/0019984 | A1 * | 1/2020 | Yuan | H04L 67/535 |

(Continued)

OTHER PUBLICATIONS

Bai et al., "The Inverse Gamma-Gamma Prior for Optimal Posterior Contraction and Multiple Hypothesis Testing", 2018, arXiv, v3, pp. 1-51 (Year: 2018).*

(Continued)

*Primary Examiner* — Hosain T Alam
(74) *Attorney, Agent, or Firm* — Foley & Lardner LLP

(57) ABSTRACT

Methods and systems are described herein for generating a trained Bayesian Hierarchical model from low signal datasets. The disclosed approach utilizes data from alternative segments as a baseline to train the Bayesian Hierarchical model. In some embodiments, the disclosed approach may supplement segment-specific features from another dataset. In some embodiments, inputs for prior distributions may be received from an expert and modified based on the model specification. In one example, the disclosed approach may be used to model probability of default for companies in a low-default segment like Energy portfolio. In this example, data from other commercial and industrial segments is used to form a baseline in the Bayesian Hierarchical model. Further, dataset containing segment-specific features for Energy is supplemented to the training dataset.

20 Claims, 7 Drawing Sheets

700

(56) References Cited

U.S. PATENT DOCUMENTS

| | | | | |
|---|---|---|---|---|
| 2021/0073669 | A1* | 3/2021 | Banerjee | G06N 3/045 |
| 2021/0117868 | A1* | 4/2021 | Sriharsha | G06N 20/20 |

OTHER PUBLICATIONS

Zhang et al., "A Hierarchical Bayes-Based Evolutionary Ensemble Classification Algorithm", Aug. 21, 2022, 2022 5th International Conference on Pattern Recognition and Artificial Intelligence (PRAI), vol. 5 (2022), pp. 138-146 (Year: 2022).*

Tian et al., "Posterior Re-calibration for Imbalanced Datasets", 2020, Advances in Neural Information Processing Systems 33, vol. 33 (2020), pp. 1-13 (Year: 2020).*

Hahn et al., "Privacy-preserving Federated Bayesian Learning of a Generative Model for Imbalanced Classification of Clinical Data", 2020, arXiv, v3, pp. 1-10 (Year: 2020).*

Khatri et al., "Empirical Hierarchical Bayes Estimation", 1992, Bayesian analysis in statistics and econometrics, vol. 1992, pp. 147-161 (Year: 1992).*

* cited by examiner

200

| | 203 | 206 | 209 |
|---|---|---|---|
| *Value* | 2 | 3 | 4 |
| *Probability* | .7 | .1 | .2 |

FIG. 2

300

| 303 | 306 | 309 | 312 | 315 |
|---|---|---|---|---|
| Class | Company | Feature A | Feature B | Default |
| HealthCare | Company A | Value | Value | False |
| HealthCare | Company B | Value | Value | False |
| HealthCare | Company C | Value | Value | False |
| HealthCare | Company D | Value | Value | False |
| HealthCare | Company E | Value | Value | True |
| HealthCare | Company F | Value | Value | False |
| HealthCare | Company G | Value | Value | False |
| HealthCare | Company H | Value | Value | False |

FIG. 3

| Class (403) | Company (406) | Feature A (409) | Feature B (412) | Default (415) |
|---|---|---|---|---|
| HealthCare | Company A | Value | Value | False |
| HealthCare | Company B | Value | Value | False |
| HealthCare | Company C | Value | Value | False |
| HealthCare | Company D | Value | Value | False |
| HealthCare | Company E | Value | Value | True |
| Energy | Company F | Value | Value | True |
| Energy | Company G | Value | Value | True |
| Energy | Company H | Value | Value | True |
| Energy | Company I | Value | Value | False |
| Energy | Company J | Value | Value | True |

FIG. 4

BAYESIAN HIERARCHICAL MODELING FOR LOW SIGNAL DATASETS

BACKGROUND

In recent years, the use of artificial intelligence, including but not limited to machine learning, deep learning, etc. (referred to collectively herein as artificial intelligence), has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. For example, artificial intelligence often relies on large amounts of high-quality data for training. Often this data is referred to as a training dataset. That is, each model is generally trained using a dataset that captures dataset-specific factor sensitivity for a particular population. This type of training enables the creation of models that generate accurate predictions. However, in many instances, high-quality data is not available in amounts large enough for effective training. Thus, a particular dataset may include only a small sample size or have class imbalance. Small sample sizes and/or class imbalance cause reliability issues for the model specification leading to biased predictions that do not generalize well in many instances. To solve that problem, model developers, in some cases, use models generated from a proxy dataset. This solution is problematic because the resulting model does not necessarily capture factor sensitivity of the low-signal population.

SUMMARY

In view of the aforementioned problems, novel methods and systems are described herein for generating a trained machine learning model from low signal datasets. Many machine learning models are generated by inputting a dataset into a training routine such that the training routine generates parameters for the features in the training dataset. As discussed above, this may not work well for datasets that have small sample sizes or have class imbalance, sometimes referred to as low signal datasets. The disclosed approach uses Bayesian Hierarchical model that is used to generate posterior distribution for parameters of the model based on priors and training dataset. Training dataset is enhanced by including a plurality of entries from similar segments as the segment with low-signal dataset. For example, while modeling probability of default (PD) for healthcare companies, data from generic commercial companies is included in the training dataset.

The training routine receives feature groups as input to select the features to be modeled. Each feature has a corresponding parameter that is modeled by the training routine. The training routine may receive inputs from an expert to generate a probability distribution for each parameter in the Bayesian Hierarchical model, called priors. The prior distribution is a probability distribution containing a plurality of probabilities for a plurality of parameter values. For example, the training routine may receive, as input, a hyperparameter for one or more parameters. Each hyperparameter may be associated with a prior distribution for a single or plurality of parameters.

The training dataset may be updated with a second dataset containing a plurality of segment-specific features for the plurality of segments to generate an updated training dataset. For example, for energy companies, second dataset could be oil and gas features that are specific to energy industry. The training routine may then train the Bayesian Hierarchical model using the updated training dataset and the prior distributions. Training the Bayesian Hierarchical model implies updating the prior probability distribution for each parameter using the updated training dataset.

In some embodiments, the training routine may assign different parameter weights to features across different segments. For example, if there is low signal from healthcare data for a feature, the training routine may assign higher weight for other industries for that feature.

Various other aspects, features, and advantages of the system will be apparent through the detailed description and the drawings attached hereto. It is also to be understood that both the foregoing general description and the following detailed description are examples and not restrictive of the scope of the disclosure. As used in the specification and the claims, the singular forms of “a,” “an,” and “the” include plural referents unless the context clearly dictates otherwise. In addition, as used in the specification and the claims, the term “or” means “and/or” unless the context clearly dictates otherwise. Additionally, as used in the specification, “a portion” refers to a part of, or the entirety of (i.e., the entire portion), a given item (e.g., data), unless the context clearly dictates otherwise.

BRIEF DESCRIPTION OF THE DRAWINGS

FIG. 2 illustrates a probability distribution for a parameter, in accordance with one or more embodiments of this disclosure.

FIG. 3 illustrates a low signal dataset, in accordance with one or more embodiments of this disclosure.

FIG. 4 illustrates the training dataset with multiple segments, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
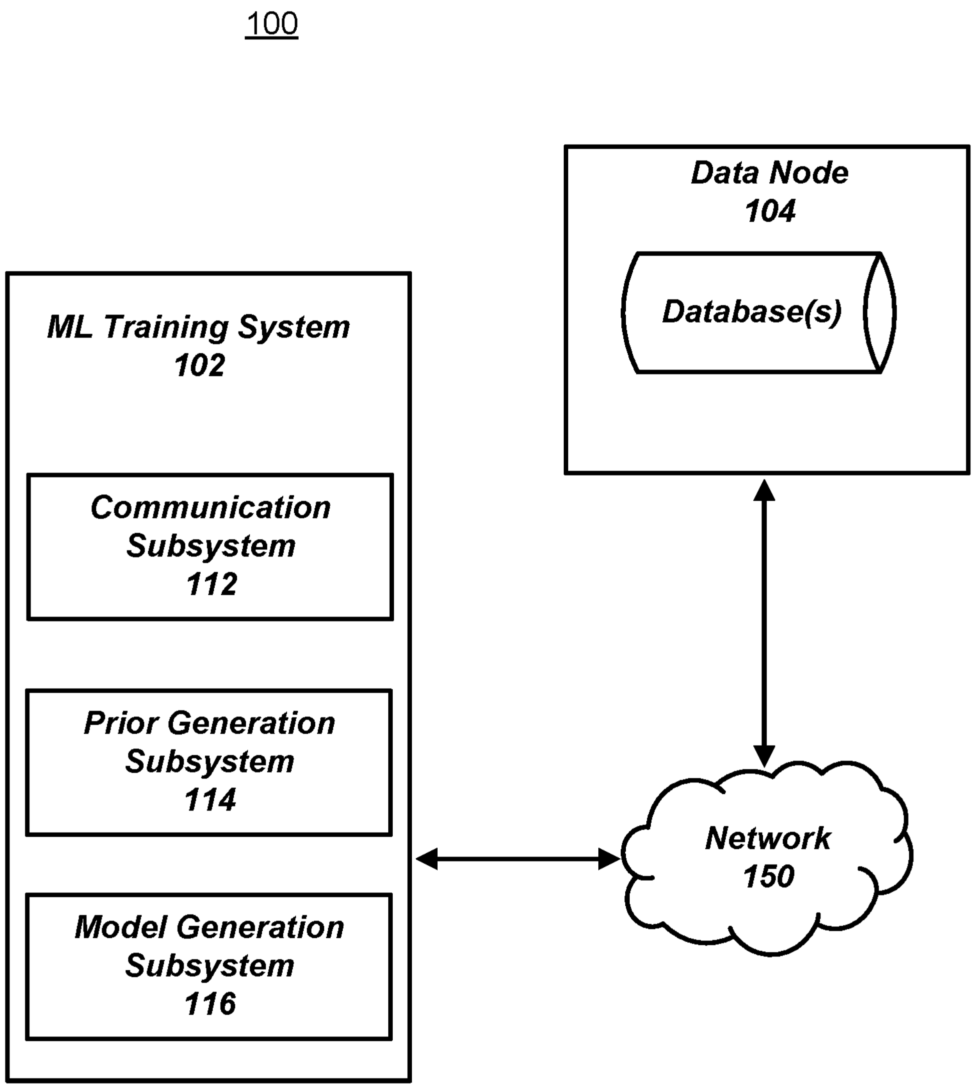
FIG. 1 shows an illustrative system for generating a trained machine learning model using low signal datasets, in accordance with one or more embodiments of this disclosure.

FIG. 1 is an example of environment 100 for generating a trained machine learning model using low signal datasets. Environment 100 includes machine learning (ML) training system 102 and data node 104. ML training system 102 may execute instructions for generating a trained Bayesian Hierarchical model using low signal datasets. ML training system 102 may include software, hardware, or a combination of the two. For example, ML training system 102 may be a physical server or a virtual server that is running on a physical computer system. In some embodiments, ML training system 102 may be hosted on a user device (e.g., a personal computer, a laptop, electronic tablet, etc.).

Data node 104 may store various data, including different training datasets and/or Bayesian Hierarchical models. In some embodiments, data node 104 may store one or more Bayesian Hierarchical models for one or more classifications. In some embodiments, data node 104 may also be used to train the Bayesian Hierarchical models. Data node 104 may include software, hardware, or a combination of the two. For example, data node 104 may be a physical server, or a virtual server that is running on a physical computer system. In some embodiments, ML training system 102 and data node 104 may reside on the same hardware and/or the same virtual server/computing device. Network 150 may be a local area network, a wide area network (e.g., the Internet), or a combination of the two.

ML training system 102 may receive input from an expert to generate a probability distribution for a parameter. The probability distribution may include a plurality of values and a plurality of probabilities. FIG. 2 illustrates one possible probability distribution for a given parameter. Columns 203, 206, and 209 of data structure 200 may illustrate different values for a particular parameter and associated probabilities for each value. In one example, the feature may be liquidity and the mechanism described in this disclosure may be used to generate a Bayesian Hierarchical model that accurately predicts default in low-default portfolios. Each portfolio may represent a segment (e.g., a type of company) such that each segment has industry-specific risk drivers that affect default. These segments may include healthcare providers, commercial and industrial companies, energy companies, etc. Thus, to get accurate default predictions, parameter sensitivity is required for each segment (e.g., each type of company) so that the specifics of each industry are captured. In some embodiments, the inputs for prior distribution or prior distributions may be received from an expert or multiple experts. Those inputs may be stored in a database and retrieved by ML training system 102.

In some embodiments, ML training system 102 may receive prior distributions for multiple parameters. To continue with the example where the machine learning model is predicting a probability of default (PD), the parameters may be for leverage, liquidity, profitability, debt-service coverage ratio, size, revenue, and/or other features. Each parameter may include a probability distribution, each probability distribution includes multiple values and corresponding probabilities.

ML training system 102 may receive feature groups and inputs for prior distributions using communication subsystem 112. Communication subsystem 112 may include software components, hardware components, or a combination of both. For example, communication subsystem 112 may include a network card (e.g., a wireless network card and/or a wired network card) that is coupled with software to drive the card. In some embodiments, communication subsystem 112 may receive a plurality of inputs for a plurality of parameters. The plurality of inputs may be parameters of a function, called hyperparameters. Communication subsystem 112 may pass the inputs to prior generation subsystem 114.

Prior generation subsystem 114 may include software components, hardware components, or a combination of both. For example, prior generation subsystem 114 may include software components that access data in memory and/or storage and may use one or more processors to perform its operations. Prior generation subsystem 114 may arrange model parameters into groups based on the feature groups provided by communication subsystem 112 and may generate common prior distributions for parameters in a group. For example, ML training system 102 may approximate a particular function using the plurality of inputs to generate prior distributions. Prior generation subsystem 114 may generate prior distribution for each parameter that is passed on to model generation subsystem 116.

Model generation subsystem 116 may generate, based on the training dataset and the prior distribution, a machine learning model (e.g., a Bayesian Hierarchical model). In Bayesian modeling, a posterior may be a probability distribution of the modeled parameter. The posterior distributions may be used to generate a plurality of classifications for each entry, sometimes referred to as posterior predictive distribution. For example, the Bayesian model may approximate a function for determining a probability of whether a particular company is going to default on a loan. The model may be generated for multiple segments/sectors. For example, one sector may be healthcare companies. Model generation subsystem 116 may generate posterior distributions for the parameters in the model. The model may include a plurality of parameters such that each parameter of the plurality of parameters can have plurality of values such that each value of the plurality of values is associated with a probability. The model may generate posterior predictive distribution and a plurality of probability of default predictions for a company that could be from healthcare, energy, commercial and industrial companies, municipal entities, or others.

In some embodiments, the model may be based on multiple parameters. For example, the model may take the form of f(A*X+B*Y)=Result. A and B may represent parameters of the model while X may represent a particular variable. Result may represent a result of the calculation (e.g., probability of a company to default on a loan). In some embodiments, X may represent liquidity associated with a company and A represents parameter for liquidity feature. B may represent another parameter for another feature Y (e.g., debt-service coverage, revenue, size, profit, or another suitable feature).

FIG. 3 illustrates an excerpt of the first training dataset 300. Column 303 may represent a feature describing a segment of the data. For example, column 303 shows that the first dataset is for healthcare providers. Column 306 may store a company name or another indicator of the enterprise. Column 309 and column 312 may correspond to features of the dataset (e.g., financial and other information). Although the dataset of FIG. 3 is illustrated with Feature A and Feature B, other features (e.g., other information) may be part of the dataset. Column 315 may indicate another feature of the dataset that represents modeling target. In this instance, column 315 illustrates whether a company has defaulted (e.g., on a loan).

FIG. 4 illustrates a training dataset with multiple segments. Field 403 indicates a segment (e.g., a class of an entity). A class may include healthcare, energy, or another suitable class. Field 406 stores a name of the entity (e.g., a name of the corporation). Field 409 and field 412 store various features associated with each entry (e.g., each entity) and field 415 stores a value indicating whether the entity was in default. For example, field 415 may be a Boolean value.

In some embodiments, ML training system 102 may add segment data and/or macroeconomic data to the training dataset. For example, for a machine learning model being trained for healthcare companies, training system may add data relating to the healthcare industry. Macroeconomic data may include disposable income per capita, personal consumption of services, number of bankruptcies, energy prices (e.g., crude oil prices) and/or other factors. In some embodiments, segment and/or macroeconomic data may be reported at a different time interval than the training data. ML training system 102 may append the data taking care of the time difference to create the updated training dataset. For example, segment and/or macroeconomic data may be collected quarterly while training dataset may be collected yearly. The data in the training dataset and segment/macroeconomic data have a timestamp associated with a collection time of the data. Accordingly, ML training system 102 may determine, for each entry in the training dataset, a corresponding time period of the plurality of time periods to add segment/macroeconomic data to each entry within the updated dataset.

In some embodiments, ML training system 102 may duplicate dataset entries for different time periods that have associated segment/macroeconomic data. For example, there may be four different data points for disposable income per capita collected quarterly. Thus, ML training system 102 may generate for each entry of the dataset four entries each having a different disposable income per capita value.

A hierarchical model may incorporate feature parameters at different levels or classes. In our example, liquidity associated with a company has parameters at segment level and at population level. Segment level parameter may capture sensitivity of companies in healthcare industry to liquidity while population level parameter captures sensitivity of companies across industries to liquidity. Bayesian statistics is an approach to data analysis based on Bayes' theorem, where domain knowledge about parameters in a model is updated with the information from training data. The domain knowledge is expressed as a prior distribution that is combined with training data in the form of a likelihood function to generate the posterior distribution. The posterior distribution may be used to generate model predictions called posterior predictive distribution. Bayesian hierarchical model utilizes Bayesian statistics to model a hierarchical model.

In ML training system 102, domain knowledge may be input using communication subsystem 112 along with the hierarchical structure of the model. The prior distributions of parameters may be generated in prior generation subsystem 114 and the Bayesian Hierarchical model may be created in model generation subsystem 116 based on the training dataset and the prior distributions. The prior generation subsystem 114 may generate common prior distributions for parameters in a group. In some embodiments, continuous variables are standardized and their prior distributions are modeled as weakly informative priors using normal distribution centered around 0 with a common group variance modeled using inverse gamma-gamma distribution; indicator variables are modeled using normal distribution using user inputs to model mean and standard deviation.

Figure 5:
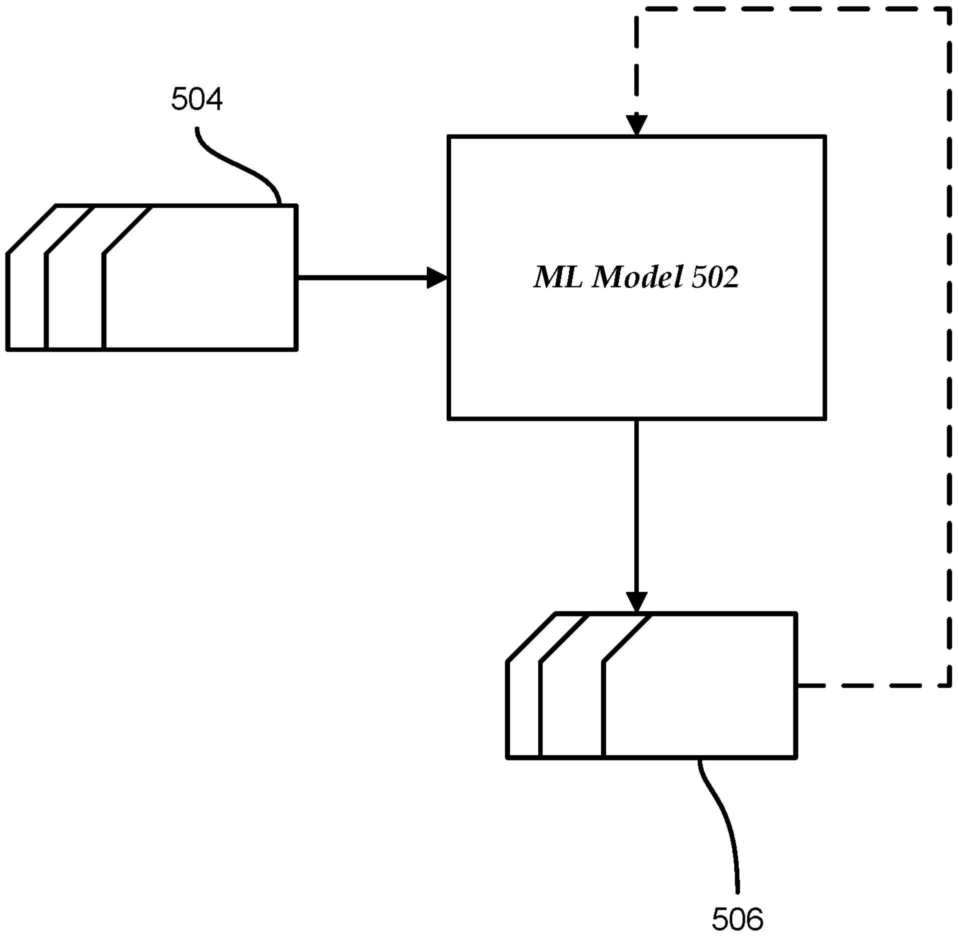
FIG. 5 illustrates an exemplary machine learning model, in accordance with one or more embodiments of this disclosure.

Bayesian Hierarchical model in the model generation subsystem 116 can be fit via various Markov Chain Monte Carlo (MCMC) sampling algorithms like Gibbs sampler, Hamiltonian Monte Carlo (HMC), No-U-Turn sampler (NUTS), or any other sampling algorithms. The sampler takes in priors and training data to generate posterior. The posterior may be used to generate model predictions called a posterior predictive distribution. FIG. 5 illustrates an exemplary working of a Bayesian Hierarchical model. In our example, the posterior predictive PD distribution is mapped to model ratings. Model ratings discretize the PD range and each rating is associated with a single PD representative of that range. The posterior 502 may take input 504 (e.g., an entry for a particular healthcare provider) and generate one or more ratings 506 (e.g., rating along with the confidence associated with each rating).

Computing Environment

Figure 6:
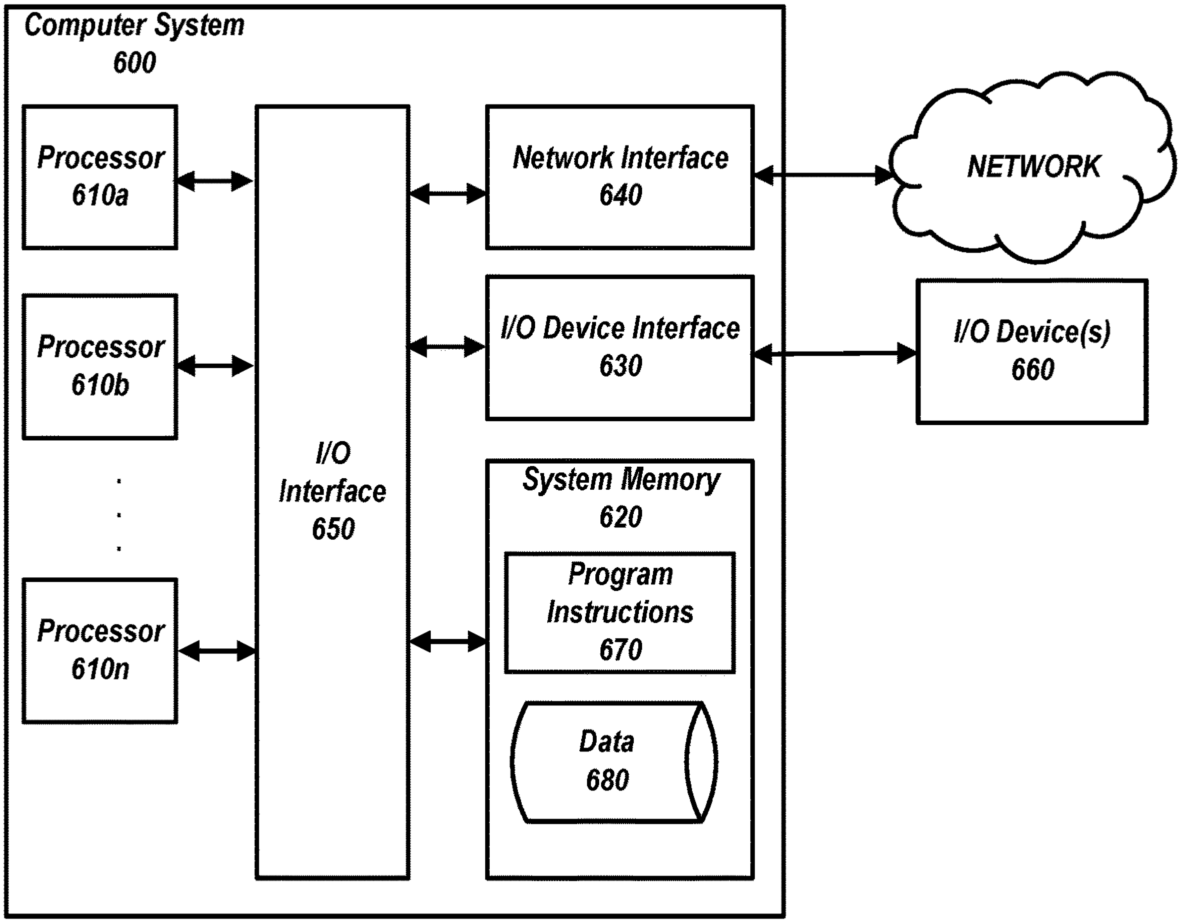
FIG. 6 shows an example computing system that may be used, in accordance with one or more embodiments of this disclosure.

FIG. 6 shows an example computing system that may be used in accordance with some embodiments of this disclosure. In some instances, computing system 600 is referred to as a computer system. A person skilled in the art would understand that those terms may be used interchangeably. The components of FIG. 6 may be used to perform some or all operations discussed in relation with FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610*a*-610*n*) coupled to system memory 620, an input/output I/O device interface 630, and a network interface 640 via an input/output (I/O) interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610*a*), or a multi-processor system including any number of suitable processors (e.g., 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computing system 600. I/O devices 660 may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computing system 600 through a wired or wireless connection. I/O devices 660 may be connected to computing system 600 from a remote location. I/O devices 660 located on remote computer systems, for example, may be connected to computing system 600 via a network 150 and network interface 640.

Network interface 640 may include a network adapter that provides for connection of computer system 600 to a network 150. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610*a*-610*n*) to implement one or more embodiments of the present techniques. Instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory computer readable storage medium. A non-transitory computer readable storage medium may include a machine readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 620 may include a non-transitory computer readable storage medium that may have program instructions stored thereon that are executable by a computer processor (e.g., one or more of processors 610*a*-610*n*) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610*a*-610*n*, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610*a*-610*n*). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative, and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
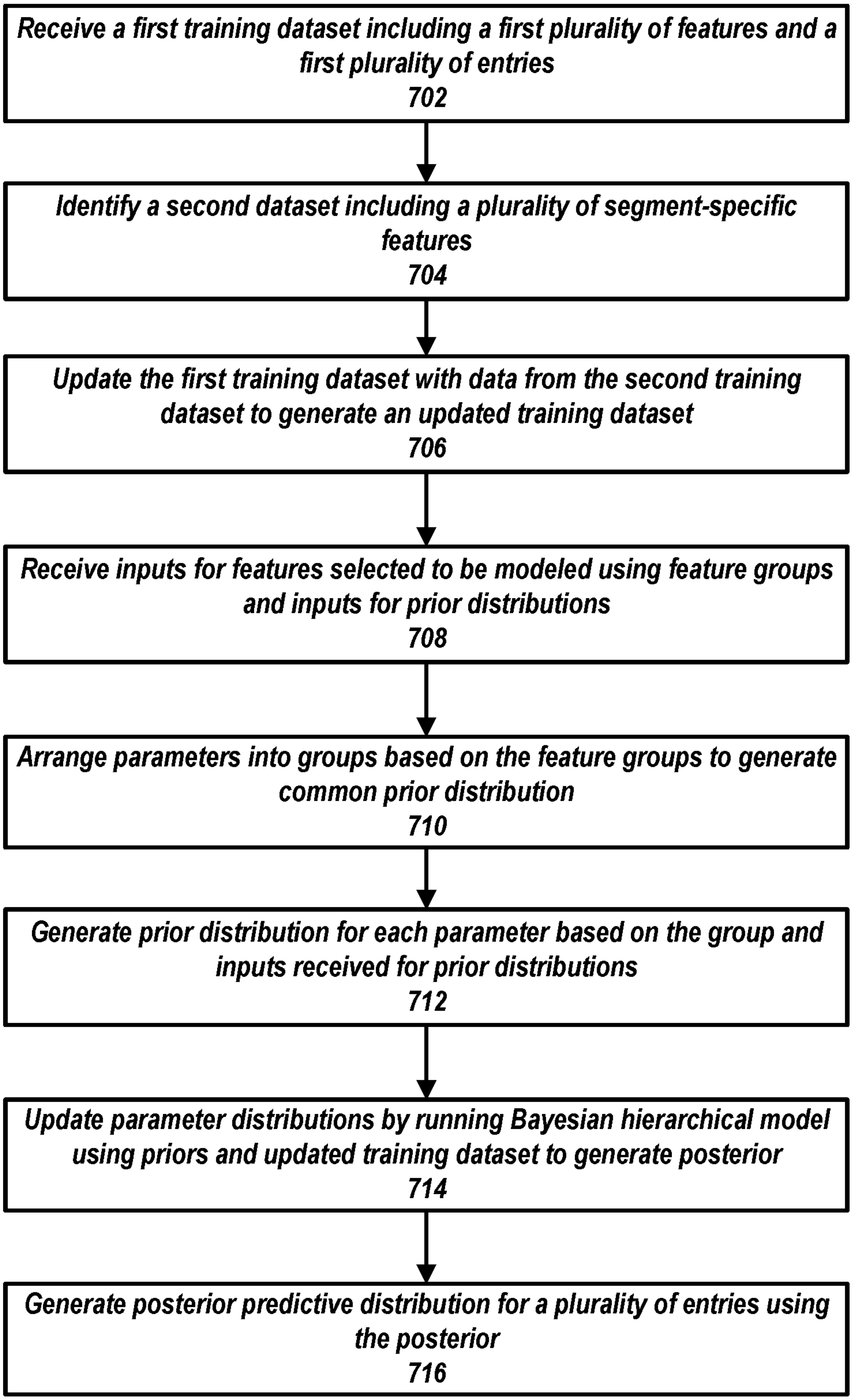
FIG. 7 is a flowchart of operations for generating a trained Bayesian Hierarchical model using low signal datasets, in accordance with one or more embodiments of this disclosure.

FIG. 7 is a flowchart 700 of operations for generating a trained machine learning model from low signal datasets. The operations of FIG. 7 may use components described in relation to FIG. 6. In some embodiments, ML training system 102 may include one or more components of computer system 600. At 702, ML training system 102 receives a first training dataset including a first plurality of features and a first plurality of entries. The first training dataset may include data for all the segments (e.g., healthcare, energy, etc.). For example, the ML training system 102 may receive the training dataset from a data node 104. ML training system 102 may receive training dataset over network 150 using network interface 640.

At 704, ML training system 102 receives a second dataset including a plurality of segment-specific features stored as a plurality of entries. At 706, ML training system 102 updates the first training dataset with data from second dataset to generate an updated training dataset. At 708, ML training system 102 receives feature groups input for selected features to be modeled. The ML training system also receives inputs to generate prior distribution of parameters.

At 710, the ML training system 102 arranges model parameters into groups based on the feature groups provided as inputs in 708 and generates common prior distribution for parameters in one or more groups. At 712, the ML training system 102 generates prior distribution for each parameter based on the group and inputs received in 708. Prior distribution may be a probability distribution that represents domain expertise before utilizing the training dataset to model the parameters.

At 714, ML training system 102 trains the machine learning model using the updated training dataset and prior distribution of parameters. ML training system 102 may use one or more processors 610*a*, 610*b*, and/or 610*n* to perform this operation and store the trained machine learning model in memory, such as system memory 620 (e.g., as part of data 680). The trained machine learning model contains updated parameter distributions called posterior. At 716, the ML training system 102 utilizes the posterior to generate probability distribution of model output for a plurality of entries called posterior predictive distribution.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating a trained machine learning model using low signal datasets, the method comprising: receiving a first training dataset comprising a first plurality of features and a first plurality of entries, wherein the first training dataset comprises first data for a plurality of segments to be modeled; receiving a second training dataset comprising a second plurality of entries, wherein the second plurality of entries comprises second data for a segment of the plurality of segments to be modeled, wherein a training routine of a machine learning model updates the first training dataset with a portion of the second data from the second training dataset to generate an updated training dataset; receiving feature groups for selected features and inputs to generate a prior probability distribution for parameters of the feature groups for the selected features, wherein the prior probability distribution comprises a plurality of values and a plurality of probabilities; arranging the parameters into groups based on the feature groups and generating a common prior probability distribution for the parameters in one or more groups of the feature groups; and training the machine learning model using the updated training dataset, wherein training the machine learning model comprises updating the common prior probability distribution for the parameters.
2. Any of the proceeding embodiments, further comprising generating the prior probability distribution that represents domain expertise prior to updating the common prior probability distribution for the parameters by training the machine learning model.
3. Any of the proceeding embodiments, further comprising: receiving segment data comprising data entries for a plurality of time periods; determining, for each entry in the updated training dataset, a corresponding time period of the plurality of time periods; and adding, to each entry in the updated training dataset, a corresponding portion of the segment data associated with each corresponding time period of the plurality of time periods.
4. Any of the proceeding embodiments, wherein generating the machine learning model comprises generating a function for one or more parameters, wherein the function comprises the plurality of values, and wherein each value of the plurality of values is associated with a probability.
5. Any of the proceeding embodiments, wherein the training routine of the machine learning model uses a posterior distribution to generate probability distribution of model output for a plurality of entries.
6. A tangible, non-transitory, machine-readable medium storing instructions that, when executed by a data processing apparatus, cause the data processing apparatus to perform operations comprising those of any of embodiments 1-5.
7. A system comprising: one or more processors; and memory storing instructions that, when executed by the processors, cause the processors to effectuate operations comprising those of any of embodiments 1-5.
8. A system comprising means for performing any of embodiments 1-5.
9. A system comprising cloud-based circuitry for performing any of embodiments 1-5.

What is claimed is:

1. A method, the method comprising:

receiving a first training dataset comprising a first plurality of features and a first plurality of entries, wherein the first training dataset comprises first data for a plurality of segments to be modeled;

receiving a second training dataset comprising a second plurality of entries, wherein the second plurality of entries comprises second data;

appending, based on a training routine of a machine learning model for a segment of the plurality of segments and based on the first data including low signal datasets for the segment of the plurality of segments, the first training dataset with a portion of the second training dataset to generate an updated training dataset;

receiving feature groups for selected features and inputs to generate a prior probability distribution for parameters of the feature groups for the selected features, wherein the prior probability distribution comprises a plurality of values and a plurality of probabilities;

arranging the parameters into groups based on the feature groups and generating a common prior probability distribution for the parameters in one or more groups of the feature groups; and training the machine learning model using the updated training dataset, wherein training the machine learning model comprises updating the common prior probability distribution for the parameters.

2. The method of claim 1, wherein the prior probability distribution represents domain expertise prior to updating the common prior probability distribution for the parameters by training the machine learning model.

3. The method of claim 1, further comprising:
receiving segment data comprising data entries for a plurality of time periods;
determining, for each entry in the updated training dataset, a corresponding time period of the plurality of time periods; and
adding, to each entry in the updated training dataset, a corresponding portion of the segment data associated with each corresponding time period of the plurality of time periods.

4. The method of claim 1, wherein the machine learning model comprises a function for one or more parameters, and wherein the function comprises the plurality of values, and wherein each value of the plurality of values is associated with a probability.

5. The method of claim 1, wherein the training routine of the machine learning model uses a posterior distribution to generate probability distribution of model output for a plurality of entries.

6. The method of claim 1, wherein arranging the parameters into the groups based on the feature groups comprises:
standardizing continuous variables; and
modeling prior distributions of the continuous variables using normal distribution centered around zero, wherein the modeling comprises modeling a common group variance using inverse gamma-gamma distribution.

7. The method of claim 1, further comprising generating, based on a posterior distribution, a plurality of classifications as output for each entry by mapping a posterior predictive distribution to a range of classes, wherein each class in the range of classes is associated with a value representative of a corresponding range.

8. A system, the system comprising:
one or more processors; and
one or more non-transitory computer-readable storage media storing instructions, which when executed by the one or more processors cause the one or more processors to perform operations comprising:
receiving a first training dataset comprising a first plurality of features and a first plurality of entries, wherein the first training dataset comprises first data for a plurality of segments to be modeled;
receiving a second training dataset comprising a second plurality of entries, wherein the second plurality of entries comprises second data;
appending, based on a training routine of a machine learning model for a segment of the plurality of segments and based on the first data including low signal datasets for the segment of the plurality of segments, the first training dataset with a portion of the second training dataset to generate an updated training dataset;
receiving feature groups for selected features and inputs to generate a prior probability distribution for parameters of the feature groups for the selected features, wherein the prior probability distribution comprises a plurality of values and a plurality of probabilities;
arranging the parameters into groups based on the feature groups and generating a common prior probability distribution for the parameters in one or more groups of the feature groups; and
training the machine learning model using the updated training dataset, wherein training the machine learning model comprises updating the common prior probability distribution for the parameters.

9. The system of claim 8, wherein the prior probability distribution represents domain expertise prior to updating the common prior probability distribution for the parameters by training the machine learning model.

10. The system of claim 8, wherein the instructions further cause the one or more processors to perform operations comprising:
receiving segment data comprising data entries for a plurality of time periods;
determining, for each entry in the updated training dataset, a corresponding time period of the plurality of time periods; and
adding, to each entry in the updated training dataset, a corresponding portion of the segment data associated with each corresponding time period of the plurality of time periods.

11. The system of claim 8, wherein the machine learning model comprises a function for one or more parameters, and wherein the function comprises the plurality of values, and wherein each value of the plurality of values is associated with a probability.

12. The system of claim 8, wherein the training routine of the machine learning model uses a posterior distribution to generate probability distribution of model output for a plurality of entries.

13. The system of claim 8, wherein the instructions for arranging the parameters into the groups based on the feature groups further cause the one or more processors to perform operations comprising:
standardizing continuous variables; and
modeling prior distributions of the continuous variables using normal distribution centered around zero, wherein the modeling comprises modeling a common group variance using inverse gamma-gamma distribution.

14. The system of claim 8, wherein the instructions further cause the one or more processors to generate, based on a posterior distribution, a plurality of classifications as output for each entry by mapping a posterior predictive distribution to a range of classes, wherein each class in the range of classes is associated with a value representative of a corresponding range.

15. One or more non-transitory, computer-readable storage medium storing instructions that when executed by one or more processors cause the one or more processors to perform operations comprising:
receiving a first training dataset comprising a first plurality of features and a first plurality of entries, wherein the first training dataset comprises first data for a plurality of segments to be modeled;
receiving a second training dataset comprising a second plurality of entries, wherein the second plurality of entries comprises second data;
appending, based on a training routine of a machine learning model for a segment of the plurality of segments and based on the first data including low signal datasets for the segment of the plurality of segments, the first training dataset with a portion of the second training dataset to generate an updated training dataset;

receiving feature groups for selected features and inputs to generate a prior probability distribution for parameters of the feature groups for the selected features, wherein the prior probability distribution comprises a plurality of values and a plurality of probabilities;

arranging the parameters into groups based on the feature groups and generating a common prior probability distribution for the parameters in one or more groups of the feature groups; and training the machine learning model using the updated training dataset, wherein training the machine learning model comprises updating the common prior probability distribution for the parameters.

16. The one or more non-transitory, computer-readable storage media of claim 15, wherein the prior probability distribution represents domain expertise prior to updating the common prior probability distribution for the parameters by training the machine learning model.

17. The one or more non-transitory, computer-readable storage media of claim 15, wherein the instructions further cause the one or more processors to perform operations comprising:

receiving segment data comprising data entries for a plurality of time periods;

determining, for each entry in the updated training dataset, a corresponding time period of the plurality of time periods; and adding, to each entry in the updated training dataset, a corresponding portion of the segment data associated with each corresponding time period of the plurality of time periods.

18. The one or more non-transitory, computer-readable storage media of claim 15, wherein the machine learning model comprises a function for one or more parameters, and wherein the function comprises the plurality of values, and wherein each value of the plurality of values is associated with a probability.

19. The one or more non-transitory, computer-readable storage media of claim 15, wherein the training routine of the machine learning model uses a posterior distribution to generate probability distribution of model output for a plurality of entries.

20. The non-transitory, computer-readable storage medium of claim 15, wherein the instructions for arranging the parameters into the groups based on the feature groups further cause the one or more processors to perform operations comprising:

standardizing continuous variables; and modeling prior distributions of the continuous variables using normal distribution centered around zero, wherein the modeling comprises modeling a common group variance using inverse gamma-gamma distribution.

* * * * *